May 19, 1925.
C. W. DAKE
1,538,172
LENS FOR HEADLIGHTS
Filed Feb. 23, 1923   2 Sheets-Sheet 1
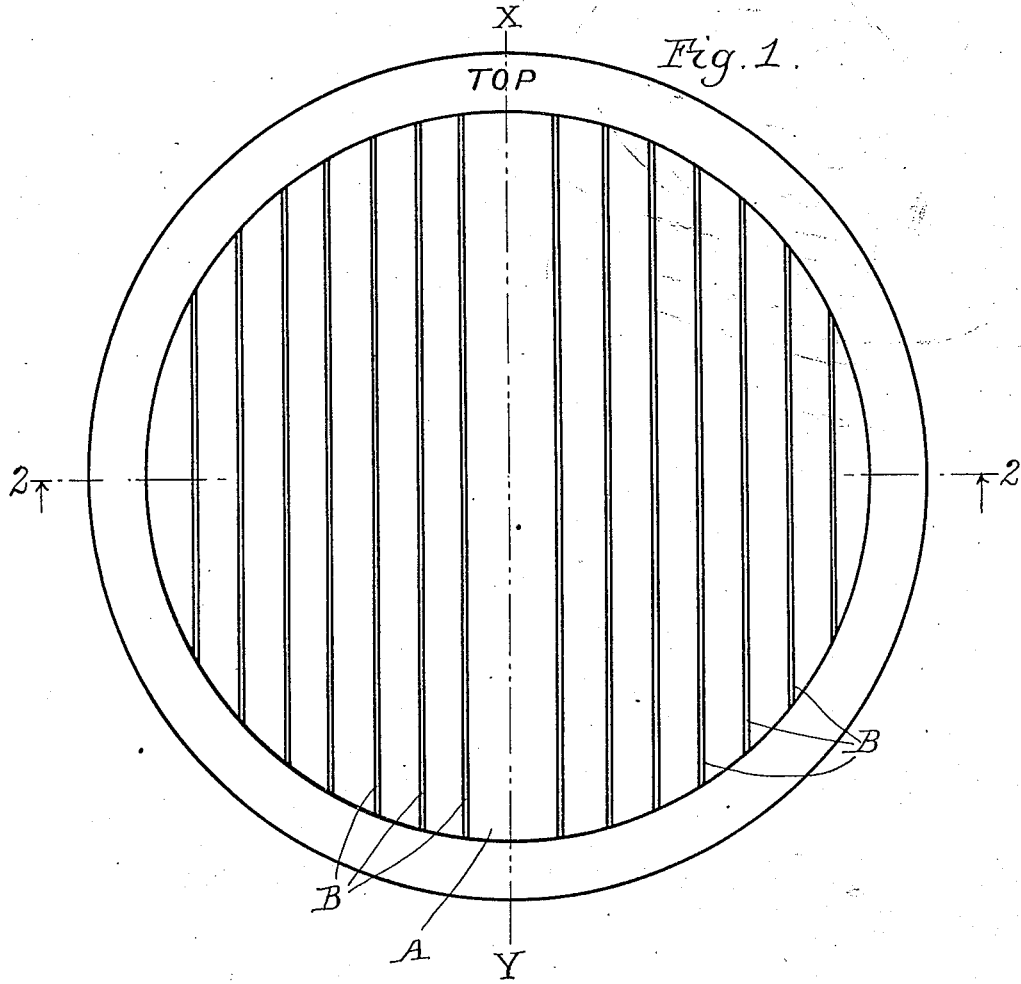

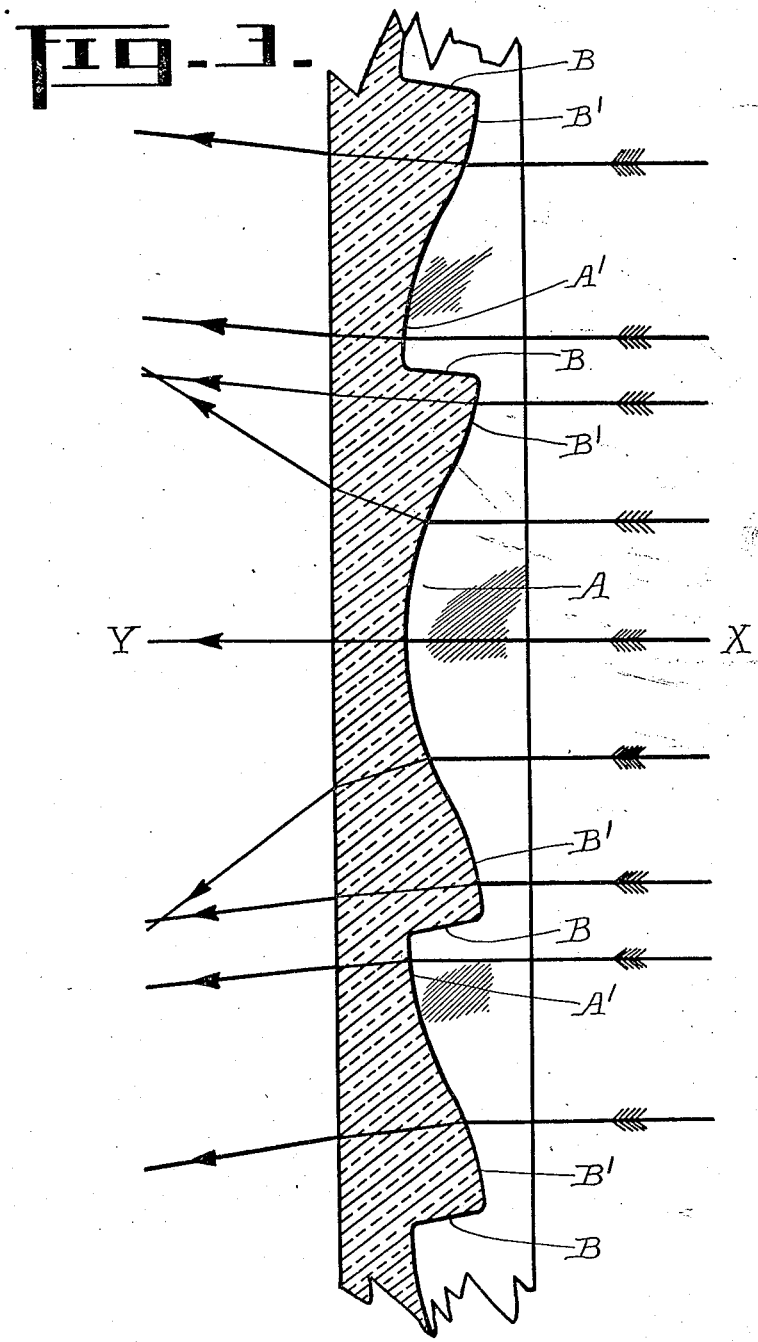

Patented May 19, 1925.

1,538,172

UNITED STATES PATENT OFFICE.

CHARLES W. DAKE, OF CHICAGO, ILLINOIS.

LENS FOR HEADLIGHTS.

Application filed February 23, 1923. Serial No. 620,562.

*To all whom it may concern:*

Be it known that I, CHARLES W. DAKE, a citizen of the United States, residing at Chicago, in the county of Cook and State of Illinois, have invented a certain new and useful Improvement in Lenses for Headlights, of which the following is a specification.

My invention relates to an improvement in lenses for use in connection with locomotive electric headlights and the like, where it is desired to produce a light which will illuminate not only immediately in front of the source of light but to the sides with substantially the same effect.

I have found that when a corrugated lens is placed in front of a reflector for the purpose of diffusing the light rays that if the light rays are so refracted as to cause them to intersect one another to any considerable extent the lighting effect is more or less interfered with, and I have discovered that to the extent to which I am enabled to prevent intersecting of the light rays to that extent the efficiency of the light will be increased. I therefore provide a lens wherein the light rays passing through the lens on the right side of a vertical line are deflected toward the right, on the left side of a vertical line are deflected to the left, thereby cutting out at least half of the interfering effect of the intersecting light rays.

Doubtless many shapes and arrangements of glass lenses might be used to accomplish this desired result, and I have illustrated it in a particular, preferred form.

The invention is illustrated more or less diagrammatically in the accompanying drawings, wherein:

Figure 1 is a plan view of the lens;

Figure 2 is a section along the line 2—2, and

Figure 3 is a section on an enlarged scale along the same line as Fig. 2, showing the central portion of the lens.

Like parts are indicated by like characters.

The lens is divided into two portions, a right-hand and a left-hand portion, there being a broad, curved channel A interposed between the two sections formed by the peculiar shape of the corrugations. These corrugations, which are on the back or inner wall of the lens, have bounding surfaces curved outwardly as indicated at $A^1$, to provide a series of channels bounded on their inner sides by flat walls B slightly inclined inwardly and on the outer sides by curved walls $B^1$. It will be noted that these walls are curved along varying lines of curvature, and the arrows are applied to show the effect of the curvature of the various parts of the lens surface upon the light rays, and it will be noticed in Fig. 3 that the light rays tend all to bend to the right or to the left, depending on which side of the central line X—Y they are located. The particular kind of curvature and the particular shape of the tooth or corrugation may be departed from. The essential thing is that the shape of the tooth or ridge or corrugation must be such as to produce an outward bending of the light ray and never an inward bending, so that no light ray ever passes across from the right-hand to the left-hand side of the beam. The result of this is that while there is bound to be some intersection of individual light rays on one side or other of the beam, there is no general intersecting or intersection of all the light rays in the beam together, as would be the case were rays from the right to cross over to the left, or vice versa.

I prefer to shape my curved wall so that toward the bottom of the ridge or the base of the straight wall B the curvature is substantially perpendicular to the axis of the beam, gradually increases for a time to a fairly sharp inclination to the axis of the beam, and then tapers off to substantial perpendicularity at the top of the next straight wall.

I claim:

1. In a lens for headlights and the like, a series of refracting ridges of saw-toothed cross section having a flat wall extending in substantially the same direction as the line of approach of the rays, and a curved wall extending from the top of one flat wall to the base of the adjacent one, the curve of said wall being compounded of arcs having centers on opposite sides of the lens, said curves being flattened at the intersection of the flat walls to approximate perpendicularity thereto.

2. In a lens for headlights and the like, a series of vertical refracting ridges of saw-toothed cross section having a flat wall extending in substantially the same direction as the line of approach of the rays, and a curved wall extending from the top of one flat wall to the base of the adjacent one, the curve of said wall being compounded of arcs having centers on opposite sides of the lens, said curves being flattened at the intersection of the flat walls to approximate perpendicularity thereto, said ridges being divided into two groups, one on each side of the central vertical line of the lens, the flat wall of each of said ridges being on the side of the ridge which faces outwardly from said central line.

Signed at Chicago, county of Cook and State of Illinois, this 19th day of February, 1923.

CHARLES W. DAKE.